Sept. 30, 1958 JOSEPH LIM 2,853,718
SEAT ATTACHED AUTOMOBILE BED
Filed May 7, 1957 2 Sheets-Sheet 1

Joseph Lim
INVENTOR.

BY *Clarence A. O'Brien*
*and Harvey B. Jackson*
Attorneys

Sept. 30, 1958  JOSEPH LIM  2,853,718
SEAT ATTACHED AUTOMOBILE BED
Filed May 7, 1957  2 Sheets-Sheet 2

Joseph Lim
INVENTOR.

United States Patent Office 2,853,718
Patented Sept. 30, 1958

2,853,718

SEAT ATTACHED AUTOMOBILE BED

Joseph Lim, Honolulu, Territory of Hawaii

Application May 7, 1957, Serial No. 657,558

1 Claim. (Cl. 5—94)

This invention relates in general to infants' beds and more particularly to an improved infant's bed which may be utilized within an automobile.

The primary object of this invention is to provide an infant's bed which may be utilized within an automobile as a bed and which may be disassembled and folded into a compact unit for ease of storage.

A further object of this invention is to provide a structure which may be utilized within an automobile as an infant's bed or which may be removed from the automobile and with a partial disassembly thereof may be utilized as an infant's playpen or bed outside of the automobile.

A still further object of this invention is to provide a child's bed to be utilized between the back of the front seat and the back of the rear seat of an automobile and which will accommodate more than one child.

Yet another object of this invention is to provide a bed carried by the back of the front seat and the back of the rear seat of an automobile and which is below the level of the tops of the seat backs thereby preventing any unnecessary draft on the children sleeping therein.

Another object of this invention is to provide a novel bed carrying frame for a seat attached automobile bed which may be utilized either in conjunction with the automobile seats or may be placed on any flat level surface.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
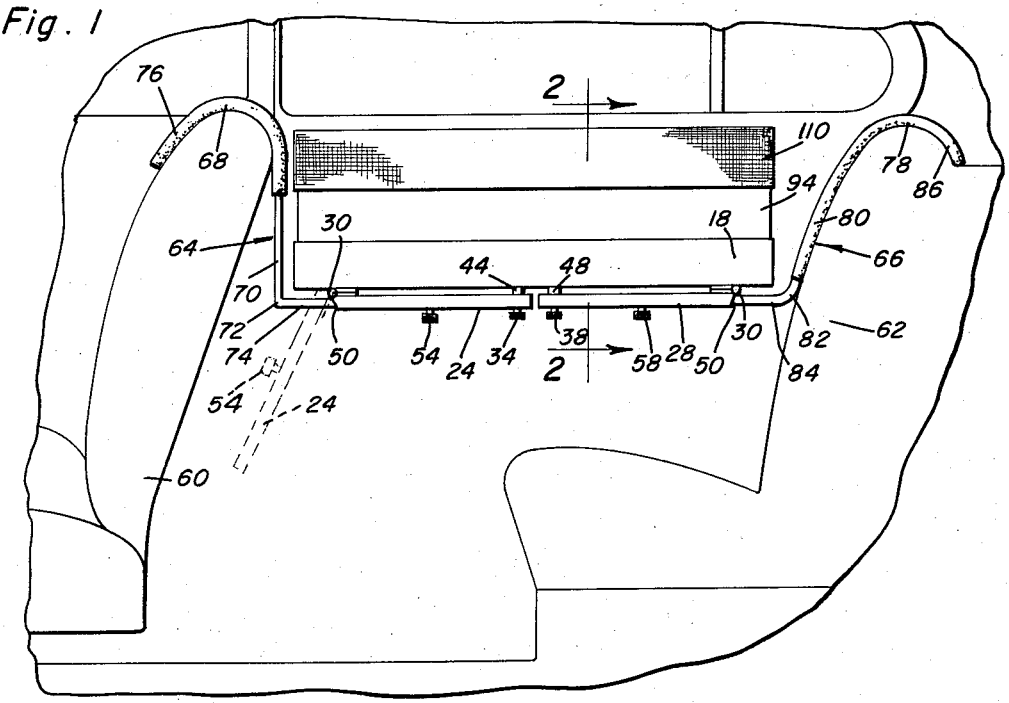
Figure 1 is a side view of the seat attached bed showing the bed installed in an automobile, and with portions of the automobile broken away.

Referring now to the drawings in detail it will be noted that the bed consists of a rectangular body, which is referred to in general by the reference numeral 10, and which is constructed of a rigid sheet material. The body 10 is provided with upstanding end walls 12 and 14 and upstanding side walls 16 and 18. The walls are formed integral with a bottom 20. The bottom 20 has attached thereto on the underside thereof, a pair of front legs 22 and 24 and a pair of back legs 26 and 28. The legs are all hingedly attached to the undersurface of the bottom 20 by means of hinges 30. The hinges 30 are located adjacent to the ends of the rectangular bottom 20 and they are foldable toward the transverse center line of the body.

Figure 3:
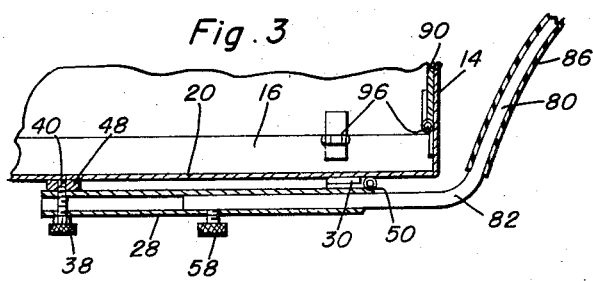
Figure 3 is a sectional view taken substantially along section line 3—3 of Figure 2 and showing details of the hanger and leg structure of the bed.
Figure 5:
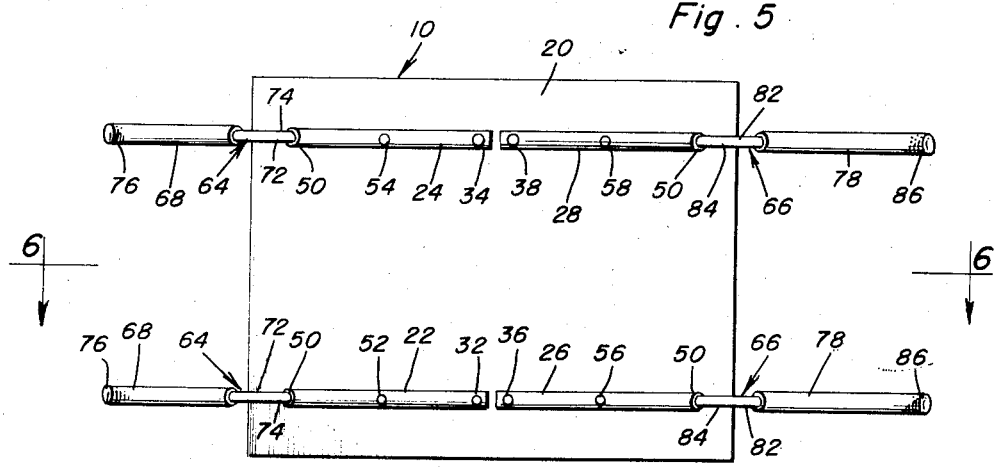
Figure 5 is a bottom view of the fully assembled bed, drawn to the same scale as Figure 1 and showing details of the supporting structure of the bed.
Figure 6:
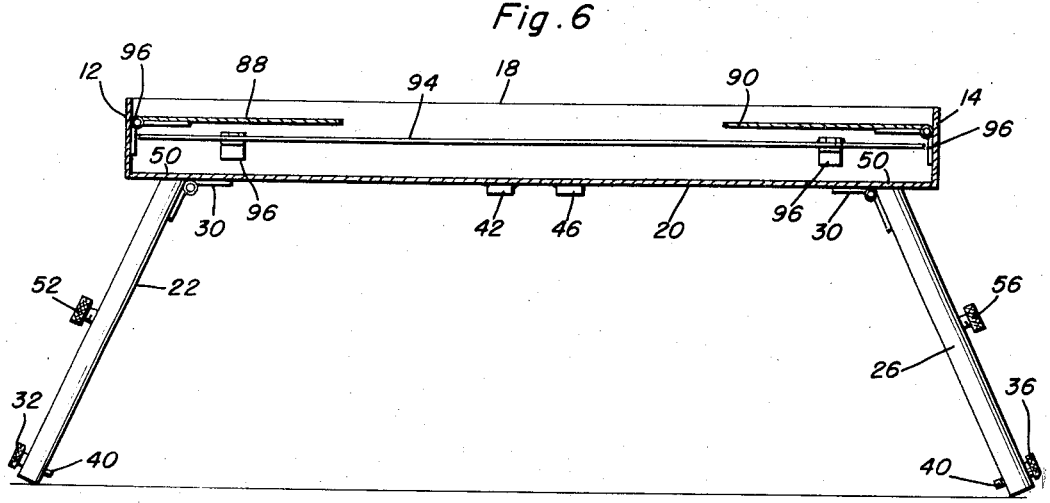
Figure 6 is an enlarged sectional view taken substantially along section line 6—6 of Figure 5.

As is best seen in Figures 1 and 3, when the legs are in a folded position they are parallel to the longitudinal center line of the bottom 20 in one plane, and parallel to the undersurface of the bottom 20 in another plane. The legs 22 through 28 are each provided, adjacent the free ends thereof, with a threaded thumb screw 32 through 38 respectively. The thumb screws extend through the tubular legs in threaded portions 40. The threaded portions 40 of the screws 32 through 38 are engageable in threaded sockets 42 through 48 respectively, which are suitably attached to the undersurface of the bottom 20. The ends of the tubular legs at the hinged end thereof are suitably angulated as at 50 in order that the legs when in an extended position will provide a steadier base for the body 10, the angulated portions of the legs bearing against the undersurface of the bottom 20. The legs 22 through 28 are further provided with a second thumb screw 52 through 58 respectively. The thumb screws 52 through 58 extend through one wall of the tubular legs only and the purpose thereof will be described hereinafter.

Figures 2, 4:
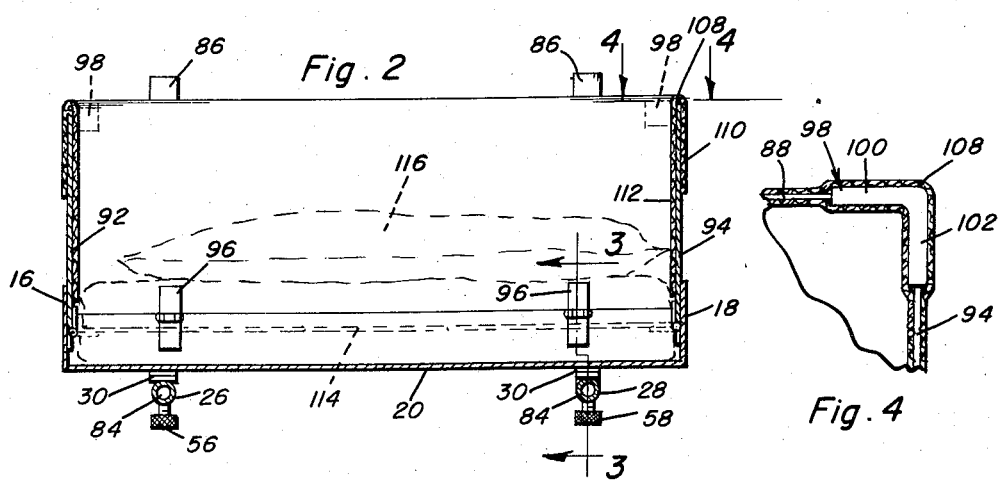
Figure 2 is an enlarged sectional view taken substantially along section line 2—2 of Figure 1 and showing a mattress and pillow in phantom lines within the bed.
Figure 4 is a still further enlarged sectional view taken substantially along section line 4—4 of Figure 2 and showing details of the corner construction of the bed.
Figure 7:
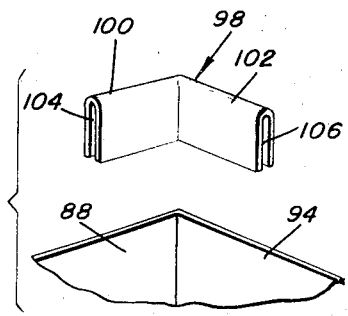
Figure 7 is an enlarged exploded perspective view of one upper corner with portions broken away for clarity.

As is best seen in Figure 1 the body 10 is adapted to be received and supported by the back of an automobile front seat 60 and the back of an automobile back seat 62. In order to accomplish this there is provided a pair of front hangers, which are referred to in general by the reference numeral 64 and a pair of back hangers which are referred to in general by the reference numeral 66. Inasmuch as the front hangers 64 are identical and interchangeable and the rear hangers 66 are identical and interchangable one of each of these hangers will be described and like reference numerals used thereon. The front hanger 64 consists of an elongated cylindrical bar having at the free end thereof an inverted U-section 68 which terminates in a vertically depending section 70, which in turn is bent in a 90° bend 72 and then proceeds rearwardly in a horizontal arm 74. The arm 74 is received within the tubular legs 22 or 24, when the legs are in a retracted or folded position. The thumb screws 52 and 54 are utilized to retain the front hangers within the legs. It should be noted that the U-portions 68 are provided with a suitable resilient covering 76 to prevent marring of the upholstery of the automobile. The rear hangers 66 consist of an inverted U-section 78 at the free end thereof, which terminates in a downwardly and forwardly curved section 80, are then bent at an obtuse angle 82 and which finally terminate in the horizontally and forwardly extending leg 84. It should be noted that the horizontal legs 84 and 74 are equally spaced above the floor of the vehicle thereby maintaining the bed in a level position in the vehicle. It should be further noted that the curved sections 78 and 80 are provided with a resilient covering 86, which also prevents marring of the upholstery on the rear seat of the vehicle. The walls 12 through 18 are provided with wall extensions 88 through 94 respectively. The extensions are attached to the inner surfaces of the upstanding walls 12 through 18 by means of hinges 96, there being provided a pair of hinges for each wall extension. The extensions, when in a folded position, are entirely within the confines of the upstanding walls and when in an extended position the outer surfaces of the extensions are in face to face engagement with the inner surfaces of the upstanding walls at the lower edge of the extensions, with the side extensions 92 and 94 being within the end extensions 88 and 90, thus forming a box corner, as will be noted in Figure 7. The extensions are maintained in an upright position by means of L-shaped corner channels, which are referred to in general by the reference numeral 98. The corner channels 98, there being one provided for each corner, consist of a pair of legs 100 and 102 having downwardly facing openings 104 and 106 respectively therein. The openings 104 and 106 are of such a size as to slip neatly over the cooperating wall extensions. The wall extensions are further provided with a cover 108, which is formed of a suitable soft blanket material and which serves as a protector for the occupant or occupants of the bed. The cover 108 is provided with an outer lip 110 and an inner depending wall 112 which extends downward into the bed a sufficient distance to cover any interior part of the bed which is not covered by a mattress or other suitable pallet. As will be noted in Figure 2 there is shown installed in the bed a mattress 114 and a pillow 116.

While the actual operation and use of the invention should be obvious a brief description of the manner in which it may be used follows. Assuming that the bed is in a folded position the wall extensions may be raised, the corner channels placed thereon and the liner placed therein. The hangers 64 and 66 may then be installed in the tubular legs and adjusted to the proper seat spacing, after which the thumb screws 52 through 58 may be tightened in order to maintain the hangers within the legs. If desired, the hangers may be removed, the thumb screws 32 through 38 released and the legs folded outwardly, after which the bed may be placed on any suitable supporting surface. It should be noted that when the bed is in a folded position all of the components thereof may be placed within the body 10 and the bed suitably stored requiring a very minimum of storage space.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A seat attached automobile bed comprising, a rectangular body adapted to receive a mattress, said body including upstanding walls about the perimeter thereof, means for supporting said body between the front and back seats of an automobile, said support means including tubular legs, and a plurality of demountable hangers, said legs being hingedly attached to the bottom of said body, said hangers adapted to be received in said legs when said legs are in a folded position, said hangers extending above said walls in forwardly and rearwardly extending portions, said portions being formed in an inverted U-shape whereby said portions will fit the contour of the backs of the automobile seats, means for maintaining said legs in a folded position adjacent and parallel to the bottom of said body, and means for immovably retaining said hangers in said legs, said maintaining means including a thumb screw carried by and adjacent to the free end of each leg, and threaded sockets affixed to the bottom of said body, said sockets being in alignment with said screws when said legs are in a folded position, said hanger retaining means comprising a thumb screw in each of said legs intermediate the ends thereof for engagement with the outer surface of said hanger when said hanger is within said leg, said hangers when removed from said legs allowing the legs to be folded outwardly and downwardly whereby the legs may be used to support the bed on any planar surface.

References Cited in the file of this patent

UNITED STATES PATENTS

| | | |
|---|---|---|
| 394,010 | Powers | Dec. 4, 1888 |
| 1,139,576 | Presson | May 18, 1915 |
| 1,304,966 | Haney | May 27, 1919 |
| 1,389,073 | Schlosser | Aug. 30, 1921 |
| 1,620,660 | Houston | Mar. 15, 1927 |
| 2,247,598 | Bohlen | July 1, 1941 |
| 2,514,644 | Irving | July 11, 1950 |
| 2,583,187 | St. Clair | Jan. 22, 1952 |
| 2,683,639 | Brenny | July 13, 1954 |